(12) United States Patent
Chen et al.

(10) Patent No.: US 8,303,127 B2
(45) Date of Patent: Nov. 6, 2012

(54) DISPLAY APPARATUS AND METHOD FOR MANUFACTURING AN OPTICAL COMPOUND LAYER

(75) Inventors: Chao-Yuan Chen, Hsinchu (TW); Jenn-Jia Su, Hsinchu (TW); Ting-Jui Chang, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 464 days.

(21) Appl. No.: 12/632,991

(22) Filed: Dec. 8, 2009

(65) Prior Publication Data
US 2010/0271800 A1 Oct. 28, 2010

(30) Foreign Application Priority Data
Apr. 27, 2009 (TW) .............................. 98113855 A

(51) Int. Cl.
*F21V 9/14* (2006.01)
*F21V 5/00* (2006.01)
(52) U.S. Cl. ................. 362/19; 362/311.01; 362/311.03; 359/485.01; 359/493.01
(58) Field of Classification Search .................... 362/19, 362/311.01, 268, 331, 332, 606, 607, 311.03; 359/488.01, 485.01–485.04, 492.01, 493.01, 359/494.01
See application file for complete search history.

(56) References Cited

U.S. PATENT DOCUMENTS

| | | | |
|---|---|---|---|
| 6,268,961 B1 * | 7/2001 | Nevitt et al. | 359/485.03 |
| 7,101,054 B2 * | 9/2006 | Shikano | 362/19 |
| 2007/0040963 A1 | 2/2007 | Maruyama et al. | |
| 2007/0183052 A1 | 8/2007 | Murata et al. | |
| 2007/0236631 A1 * | 10/2007 | Ohtani et al. | 359/485.01 |

\* cited by examiner

*Primary Examiner* — Bao Q Truong
(74) *Attorney, Agent, or Firm* — Thomas, Kayden, Horstemeyer & Risley, LLP

(57) ABSTRACT

A display apparatus and a method for manufacturing an optical compound layer are provided. The display apparatus comprises a light source and an optical compound layer, wherein the light source is adapted to emit a light beam, and the light beam has a polarization direction. The optical compound layer is disposed on the light source correspondingly to receive the light beam. The optical compound layer comprises a thin film and a plurality of dopants doped therein. One of the thin film and the dopants has a specific orientation which is substantially the same as the polarization direction of the light beam and the refractive indexes of the thin film and the dopants are substantially the same as well.

22 Claims, 8 Drawing Sheets

DISPLAY APPARATUS AND METHOD FOR MANUFACTURING AN OPTICAL COMPOUND LAYER

This application claims the benefit from the priority of Taiwan Patent Application No. 098113855 filed on Apr. 27, 2009, the disclosures of which are incorporated by reference herein in their entirety.

CROSS-REFERENCES TO RELATED APPLICATIONS

Not applicable.

BACKGROUND OF THE INVENTION

1. Field of the Invention

The present invention relates to a display apparatus, and more particularly, to a display apparatus capable of delivering a desirable anti-glare effect and improving the output quality of color performance.

2. Descriptions of the Related Art

With the rapid development of display technology, the requirements of image contrast and anti-glare properties of display apparatuses are being heightened accordingly. "Image contrast" refers to the gradient levels between the black and white colors; the larger the number of gradient levels is, the more vivid and richer the colors presented are, and a color performance is better. "Glare" refers to the characteristics of a transparent material with regard to reflecting rays. The higher the lighting reflectivity of the transparent material is, the lower the lighting transmittance of the material will be; consequently, a lot of reflecting rays will exist on the surface of the transparent material, which phenomenon is called as "glaring". Therefore, it is important to increase the transmittance and decrease the reflectivity to mitigate the glare to present perfect images in display apparatuses.

To obtain high-quality image output and give users a comfortable visual effect, the design and manufacturing processes of optical components adopted in a display apparatus become very important. Existing display apparatuses such as liquid crystal displays (LCDs) are usually provided with an anti-glare film on a panel thereof for preventing ambient light incident on the panel, and from being partially reflected on the panel surface thereon to cause glare. However, the conventional anti-glare film may degrade the color performance.

FIG. 1 illustrates a schematic view illustrating how a conventional anti-glare film scatters light in a display apparatus. For briefly describing the prior art, FIG. 1 herein merely illustrates the anti-glare film that serves as the anti-glare function in the display apparatus to show drawbacks in the prior art. Herein, an LCD is illustrated as an example of the display apparatus. On a polarizer 13 of the display apparatus is disposed an anti-glare film 17, in which a plurality of dopants 153 is doped. When light rays 15 emitted from a light source 11 are incident on the polarizer 13, the polarization direction of the light rays 15 is transformed through the polarizer 13 into a specific polarization direction (i.e., a linear polarization direction) to result in polarized light rays 15P which are incident on the anti-glare film 17, then emit from the anti-glare film 17 on a surface 151 as polarized light rays 15P. It should be noted that conventional anti-glare film 17 improves the glaring issue and decrease the glaring phenomenon by virtue of particle sizes of the plurality of dopants 153 filled therein. However, such the anti-glare film 17 undesirably degrades the color performance primarily due to the fact that a portion of the polarized light rays 15P intended for display purposes are also scattered disorderly by the anti-glare film 17 from the surface 151 to cause a loss of front-view contrast of the display apparatus. In particular, when a user is viewing a screen (not shown) of the LCD right from the front side, the color performance of images presented in the screen will be degraded significantly; briefly speaking, the number of gray gradient levels of images between the black color and the white color decreases, resulting in monotonous colors.

In view of solving the aforesaid problems, efforts still have to be made in the art to mitigate the glaring phenomenon in the display apparatuses without compromising the color performance.

SUMMARY OF THE INVENTION

One objective of the present invention is to provide a display apparatus capable of delivering a good anti-glare effect and improving the output quality of color performance of images.

The present invention provides a display apparatus, which comprises a light source and an optical compound layer. The light source thereof is adapted to emit a light beam which has a polarization direction. The optical compound layer is disposed correspondingly to the light source device to receive the light beam thereof. The optical compound layer comprises a directional thin film and a plurality of dopants. The directional thin film has a first refractive index corresponding to the first optical axis, with the first optical axis substantially parallel with the polarization direction. The plurality of dopants are arranged in the directional thin film and have a second refractive index, with a difference value between the first refractive index and the second refractive index ranging from 0 to 0.04.

The present invention also provides a display apparatus, which comprises a light source and an optical compound layer. The light source is adapted to emit a light beam which has a polarization direction. The optical compound layer is disposed correspondingly to the light source device to receive the light beam. Unlike the aforesaid display apparatus, the optical compound layer of this display apparatus comprises a thin film and a plurality of directional dopants. The thin film has a first refractive index. The plurality of directional dopants are arranged in the thin film and have a second refractive index corresponding to a second optical axis, with the second optical axis substantially parallel with the polarization direction. The difference value between the first refractive index and the second refractive index ranges substantially from 0.01 to 0.15.

Another objective of the present invention is to provide a method for manufacturing an optical compound layer, which is used to manufacture a display apparatus capable of effectively resisting the glare caused by reflection of ambient light and improving the output quality of color performance of images.

The method for manufacturing an optical compound layer used in the display apparatus according to the present invention comprises the following steps: (a) providing a thin film; (b) aligning the thin film to transform the thin film into a directional thin film; and (c) doping dopants in the directional thin film thereof.

Another method for manufacturing an optical compound layer according to the present invention comprises the following steps: (a) providing a thin film; (b) doping dopants in the thin film; and (c) aligning the plurality of dopants to transform the plurality of dopants into the plurality of directional dopants.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, the present invention will be explained with reference to several embodiments thereof and attached drawings. However, structural profiles and dimensions disclosed in these embodiments and the attached drawings are only for purpose of illustration, but not to limit the present invention to any specific environment, applications or particular implementations described in these embodiments.

Figure 1:
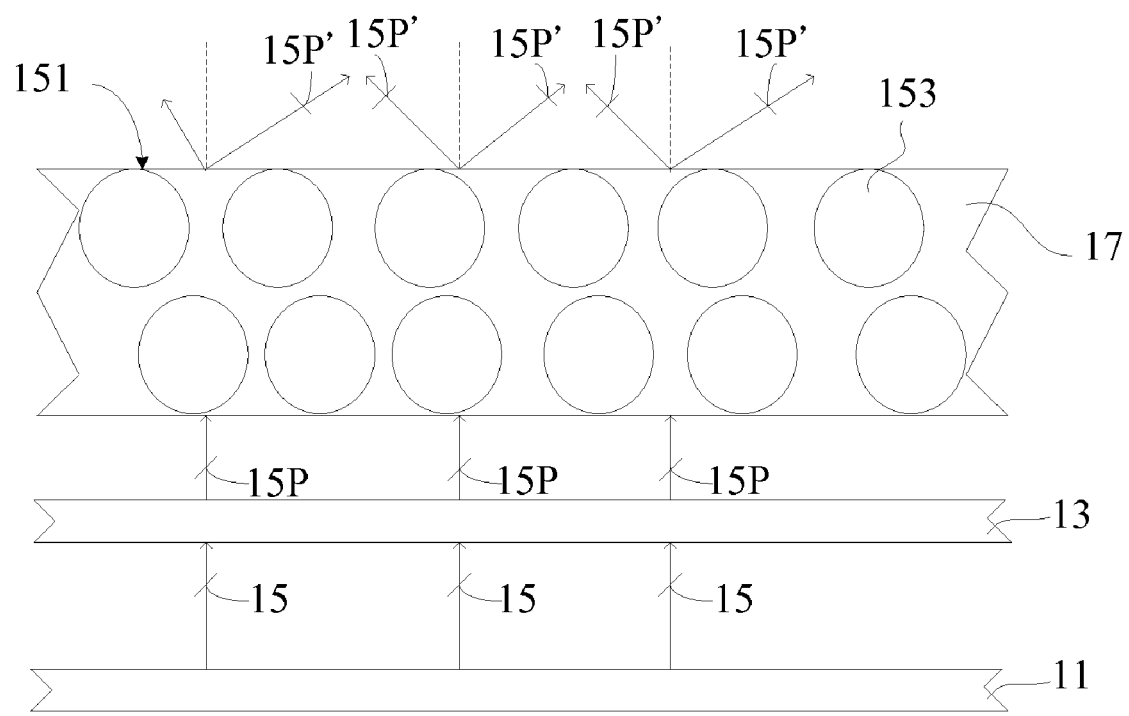
FIG. 1 is a schematic view illustrating how a conventional display apparatus utilizes an anti-glare film to scatter light rays.
Figure 2:
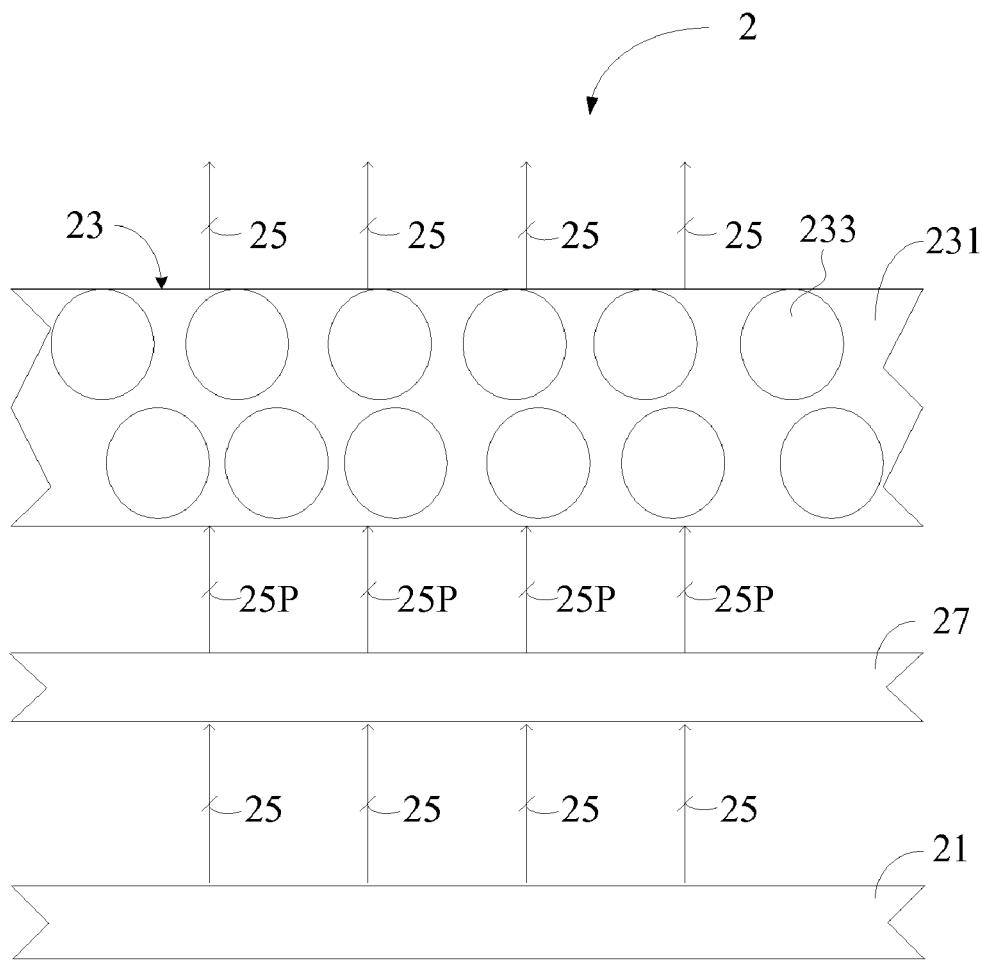
FIG. 2 is a schematic view of a display apparatus in an embodiment of the present invention.

FIG. 2 illustrates a schematic view of a display apparatus 2 in an embodiment of the present invention. It should be particularly noted that for the sake of simplicity of the disclosure in this invention, only optical components for anti-glare purposes will be described herein with reference to the attached drawings, while other components of the display apparatus 2 are omitted from description.

The display apparatus 2 comprises a light source 21, a polarizing thin film 27 and an optical compound layer 23. Therein, the light source 21 is adapted to emit a light beam 25 with an ordinary ray polarization direction and an extra-ordinary ray polarization direction. The polarizing thin film 27 is disposed between the light source 21 and the optical compound layer 23. In this embodiment, the polarizing thin film 27 is a linear polarizer, although it is not merely limited thereto. The polarizing thin film 27 in this embodiment functions to transform the emitted light beam 25 from the light source 21 into a polarized light beam 25P by passing through it. The polarized light ray 25P has a specific polarization direction (e.g., a linear polarization direction); i.e., the polarizing thin film 27 only transmits the polarized light beam 25P with either the ordinary ray polarization direction or the extra-ordinary ray polarization direction. The optical compound layer 23 has a surface thereof disposed correspondingly on the light source 21 to receive the polarized light beam 25P, which then scatters outwards from the opposite surface of the optical compound layer 23.

The optical compound layer 23 comprises a thin film 231 and a plurality of dopants 233. One of the technical features of this embodiment of the present invention is that, by properly choosing the material of the thin film 231 and the material of the dopants 233 so that one of the thin film 231 and the dopants 233 will have a specific polarization direction, which is substantially parallel with one of the polarization direction of the ordinary ray and the extra-ordinary ray in the polarized light beam 25P transmitted through the polarizing thin film 27. On the other hand, the specific polarization direction aforesaid will be perpendicular (orthogonal) to the polarization direction of the others in the polarized light beam 25P which is not transmitted through the polarizing thin film 27. For example, if the polarized light beam 25P transmitted through the polarizing thin film 27 is an ordinary ray, the specific polarization direction exhibited by one of the thin film 231 and the dopants 233 will be substantially parallel with the polarization direction of the ordinary ray but perpendicular (orthogonal) to that of the extra-ordinary ray (not shown) which is not transmitted through the polarizing thin film 27. Conversely, if the polarized light beam 25P transmitted through the polarizing thin film 27 is an extra-ordinary ray, the polarization direction exhibited by one of the thin film 231 and the dopants 233 will be substantially parallel with the polarization direction of the extra-ordinary ray but perpendicular (orthogonal) to that of the ordinary ray which is not transmitted through the polarizing thin film 27.

Furthermore, in the polarization direction of the polarized light beam 25P, either the thin film 231 or the dopant 233 has substantially the same refractive index, or a difference of index therebetween that ranges between 0 and 0.04. In specific, assume the following: (1) the thin film 231 is a directional thin film which has an ordinary refractive index of $Fn_o$ and an extra-ordinary refractive index of $Fn_e$, with the ordinary refractive index $Fn_o$ of the thin film 231 substantially the same as the extra-ordinary refractive index $Fn_e$ of the thin film 231 or a difference of index therebetween ranging between 0.01 and 0.15 ($0.01 \leq |Fn_o - Fn_e| \leq 0.15$); and (2) the dopants 233 are non-directional and have a refractive index of Dn. Then, when the incident polarized light beam 25P is an ordinary ray, the ordinary refractive index $Fn_o$ of the thin film 231 is substantially the same as the refractive index Dn of the dopants 233, or has a difference of index therebetween that ranges between 0 and 0.04 ($0 \leq |Fn_o - Dn| \leq 0.04$). When the incident polarized light beam 25P is an extra-ordinary ray, the extra-ordinary refractive index $Fn_e$ of the thin film 231 is substantially the same as the refractive index Dn of the dopants 233, or has a difference therebetween that ranges between 0 and 0.04 ($0 \leq |Fn_e - Dn| 0.04$).

In another scenario, assume that the dopants 233 are directional dopants which have an ordinary refractive index of $Dn_o$ and an extra-ordinary refractive index of $Dn_e$, with the ordinary refractive index $Dn_o$ of the dopants 233 substantially the same as the extra-ordinary refractive index $Dn_e$ of the dopants 233 or has a difference of index therebetween that ranges between 0.01 and 0.15 ($0.01 \leq |Dn_o - Dn_e| \leq 0.15$). The thin film 231 is non-directional and has a refractive index of Fn. Then, when the incident polarized light beam 25P is an ordinary ray, the ordinary refractive index $Dn_o$ of the dopants 233 is substantially the same as the refractive index Fn of the thin film 231, or has a difference of index therebetween that ranges between 0 and 0.04 ($0 \leq |Dn_o - Fn| \leq 0.04$). When the incident polarized light beam 25P is an extra-ordinary ray, the extra-ordinary refractive index $Dn_e$ of the dopants 233 is substantially the same as the refractive index Fn of the thin film 231, or has a difference of index therebetween that ranges between 0 and 0.04 ($0 \leq |Dn_e - Fn| \leq 0.04$).

As a result, for the polarized light beam 25P emitted from the light source 21 and passing through the polarization thin film 27, the optical compound layer 23 substantially becomes a transparent film that exhibits no scattering effect at all, which results in an improved front-view contrast of the display. On the other hand, for ambient light from the outside which is not polarized, the optical compound layer 23 still functions as an anti-glare film that delivers a mat effect. Thereby, anti-glare and image contrast are both improved. Hereinbelow, different equivalent variations of the optical compound layer 23 will be described specifically with reference to two different examples.

Figure 3A:
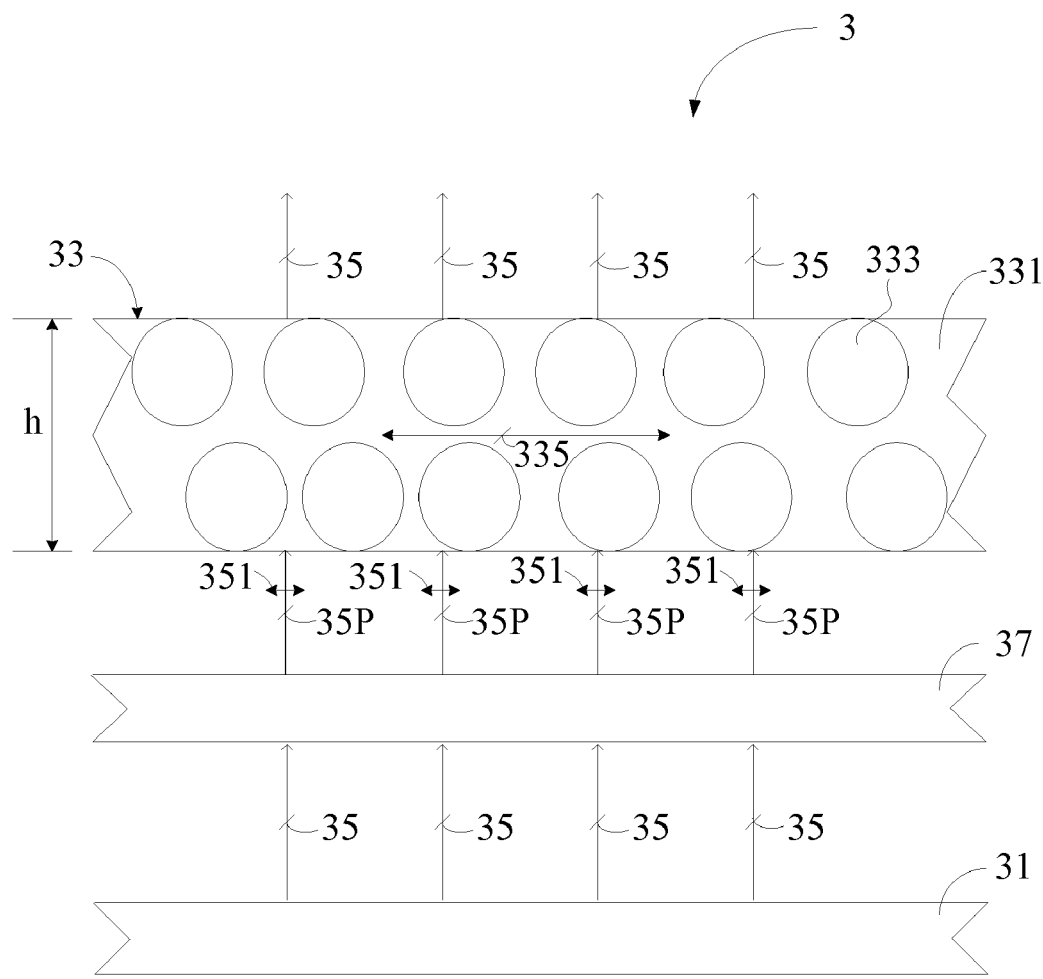
FIG. 3A is a schematic view of a display apparatus in an embodiment of the present invention.

FIG. 3A illustrates a schematic view of the first preferred embodiment of an anti-glare display apparatus 3 of the present invention. The display apparatus 3 comprises a light source 31, a linear polarizing thin film 37 and an optical compound layer 33. In general, a display panel, such as liquid crystal panel, of the display apparatus 3 is usually disposed between the optical compound layer 33 and the linear polarizing thin film 37. In other words, the optical compound layer 33 is most close to user than other elements. The optical compound layer 33 comprises a directional thin film 331 and a plurality of dopants 333. The arrangement of optical components is generally the same as that of the display apparatus shown in FIG. 2, so references may be made to the above description for arrangement of the optical components as well as the entire process of the emitted light beam 35 from the light source 31 passing through the linear polarizing thin film 37 as a polarized light beam 35P and then emitted through the optical compound layer 33. No further description will be made herein. Before passing through the linear polarizing thin film 37, the light beam 35 may be a common light beam or a light beam of any polarization direction, e.g., linear polarization, elliptical polarization or circular polarization; but once it passes through the linear polarizing thin film 37, the light beam 35 becomes a linear polarized light beam 35P, which is then incident on the optical compound layer 33.

In this embodiment, the optical compound layer 33 has a thickness h that ranges between 50 micrometers (μm) and 500 μm, and preferably of 150 μm. The directional thin film 331 included in the optical compound layer 33 is made of a polymer material, which comprises at least one of PVA (Polyvinyl Alcohol), PET (Polyethylene terephthalate), PES (Polysulfone), and PC (Polycarbonates). Additionally, the directional thin film 331 may also be made of a macromolecule liquid crystal material, which comprises either a positive liquid crystal material or a negative liquid crystal material.

The directional thin film 331 may be aligned to have a first optical axis 335 which is substantially parallel with the ordinary ray polarization direction or the extra-ordinary ray polarization direction, and has a first refractive index $Fn_o$ or $Fn_e$ corresponding to the first optical axis 335, i.e., an ordinary refractive index $Fn_o$ or an extra-ordinary refractive index $Fn_e$. The first refractive index $Fn_o$ or $Fn_e$ ranges between 1.40 and 1.80 ($1.40 \leq Fn_o \leq 1.80$ or $1.40 \leq Fn_e \leq 1.80$). The first optical axis 335 is substantially parallel with the polarization direction 351 of the polarized light beam 35P received by the optical compound layer 33; that is, the first optical axis 335 is substantially parallel with the ordinary ray polarization direction or the extra-ordinary ray polarization direction. As a result, the polarized light beam 35P is adapted to pass through and emit from the optical compound layer 33. The optical axis 335 and the polarization direction 351 shown in FIG. 3A are only to indicate a physical phenomenon in the optics, but does not mean that the material for guiding the light traveling direction "physically" exists in the directional thin film 331; likewise, the polarization direction 351 does not represent a specific traveling direction of the polarized light beam 35P, and the technical concept thereof can be readily understood by those skilled in the optics or the field of optoelectronic and thus will not be further described herein.

The dopants 333 are arranged in the directional thin film 331, and have a second refractive index Dn which ranges between 1.40 and 1.80 ($1.40 \leq Dn \leq 1.80$). In this embodiment, the dopants 333 are a plurality of spherical particles with a diameter that substantially ranges between 0.2 micrometers and 2 micrometers. The material of the dopants 333 comprises at least one of the following: PMMA (Polymethylmethacrylate), PET (Polyethylene terephthalate), PES (Polysulfone) or PC (Polycarbonates).

According to the above description, as long as a difference value between one of the first refractive indexes $Fn_o$, $Fn_e$ and the second refractive index Dn in the polarization direction of the exiting light ranges between 0 and 0.04 (i.e., $0 \leq |Fn_o - Dn| \leq 0.04$ or $0 \leq |Fn_e - Dn| \leq 0.04$), the optical compound layer 33 will become a substantially transparent film for the polarized light beam 35P passing through the polarizing thin film 37; and as long as a difference value between the other of the first refractive indexes $Fn_o$, $Fn_e$ and the second refractive index Dn ranges between 0.01 and 0.15 (i.e., $0.01 \leq |Fn_o - Dn| \leq 0.15$ or $0.01 \leq |Fn_e - Dn| \leq 0.15$), the ambient light will be allowed to transmit through the optical compound layer 33 without being reflected, thereby delivering an anti-glare effect. Consequently, the display apparatus 3 may not only provide the conventional anti-glare effect on the light exiting surface of the optical compound layer 33, but also significantly improve the color performance.

In summary, the first preferred embodiment may be rearranged and divided into a first embodiment A and a first embodiment B as shown in Table 1:

TABLE 1

|  | The first optical axis 335 is parallel with the ordinary ray polarization direction |
| --- | --- |
| The first embodiment A |  |
| The directional thin film 331 + the dopants 333<br>$1.40 \leq Fn_o \leq 1.80$<br>$1.40 \leq Fn_e \leq 1.80$<br>$1.40 \leq Dn \leq 1.80$ | $0.01 \leq |Fn_o - Fn_e| \leq 0.15$<br>$0 \leq |Fn_o - Dn| \leq 0.04$<br>$0.01 \leq |Fn_e - Dn| \leq 0.15$ |
|  | The first optical axis 335 is parallel with the extra-ordinary ray polarization direction |
| The first embodiment B |  |
| The directional thin film 331 + the dopants 333<br>$1.40 \leq Fn_o \leq 1.80$<br>$1.40 \leq Fn_e \leq 1.80$<br>$1.40 \leq Dn \leq 1.80$ | $0.01 \leq |Fn_o - Fn_e| \leq 0.15$<br>$0 \leq |Fn_e - Dn| \leq 0.04$<br>$0.01 \leq |Fn_o - Dn| \leq 0.15$ |

Figure 3B:
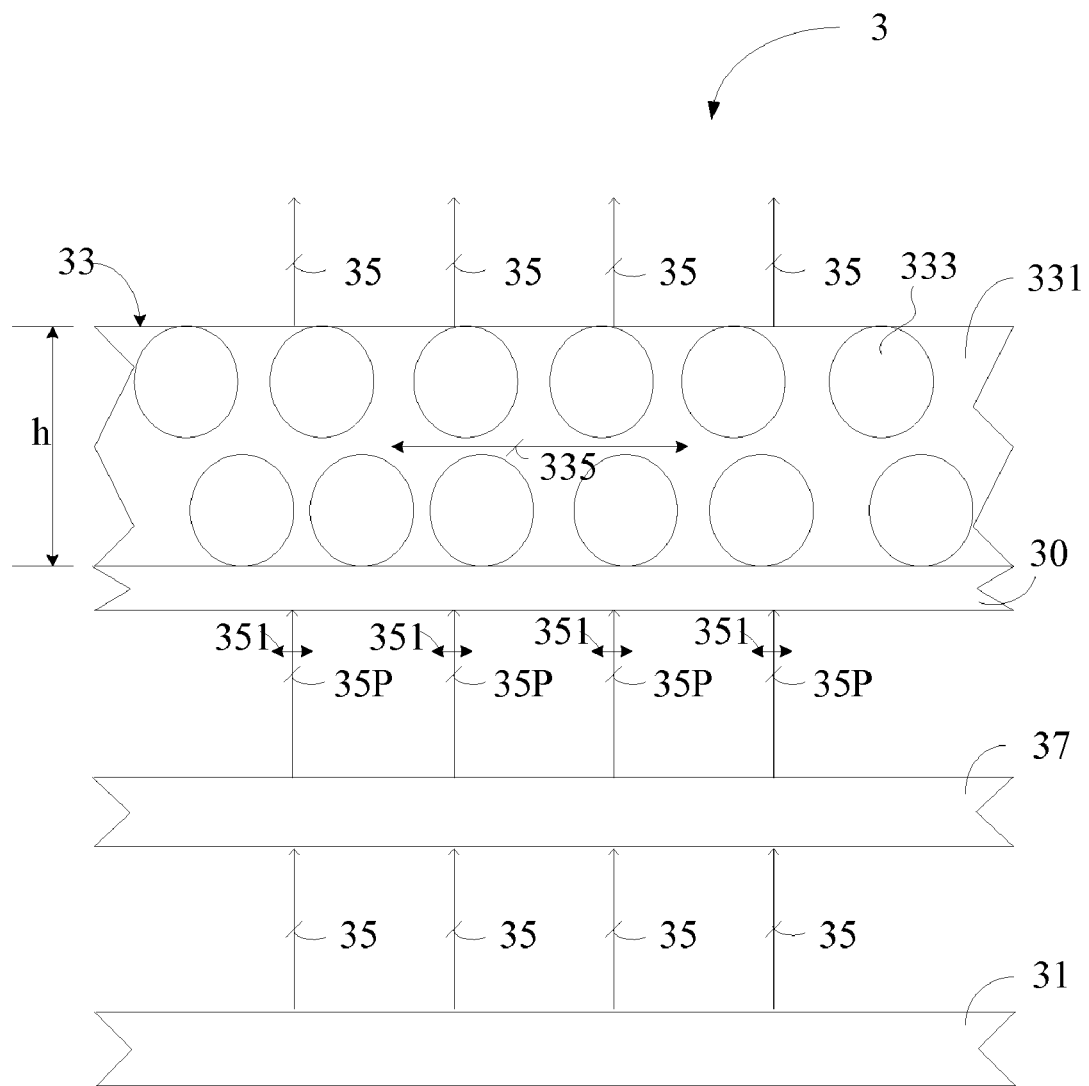
FIG. 3B is a schematic view of a display apparatus in an embodiment of the present invention.

It should be noted that, in real practice, the optical compound layer 33 would be formed on a substrate 30 for manufacturing reason. More specifically, the directional thin film 331 would be formed on a transparent substrate 30, such as, a glass substrate, as shown in FIG. 3B. The transparent substrate 30 only acts as a supporting base for the optical compound layer 33 without generating any substantial change for the optical features of the optical compound layer 33. Moreover, the directional thin film 331 would be preferably detached from the substrate 30 just as shown in FIG. 3A. In other embodiment, the substrate 30 may also be one of the substrates of the display panel. For example, the array substrate or the color filter substrate of the liquid crystal panel.

Figure 4A:
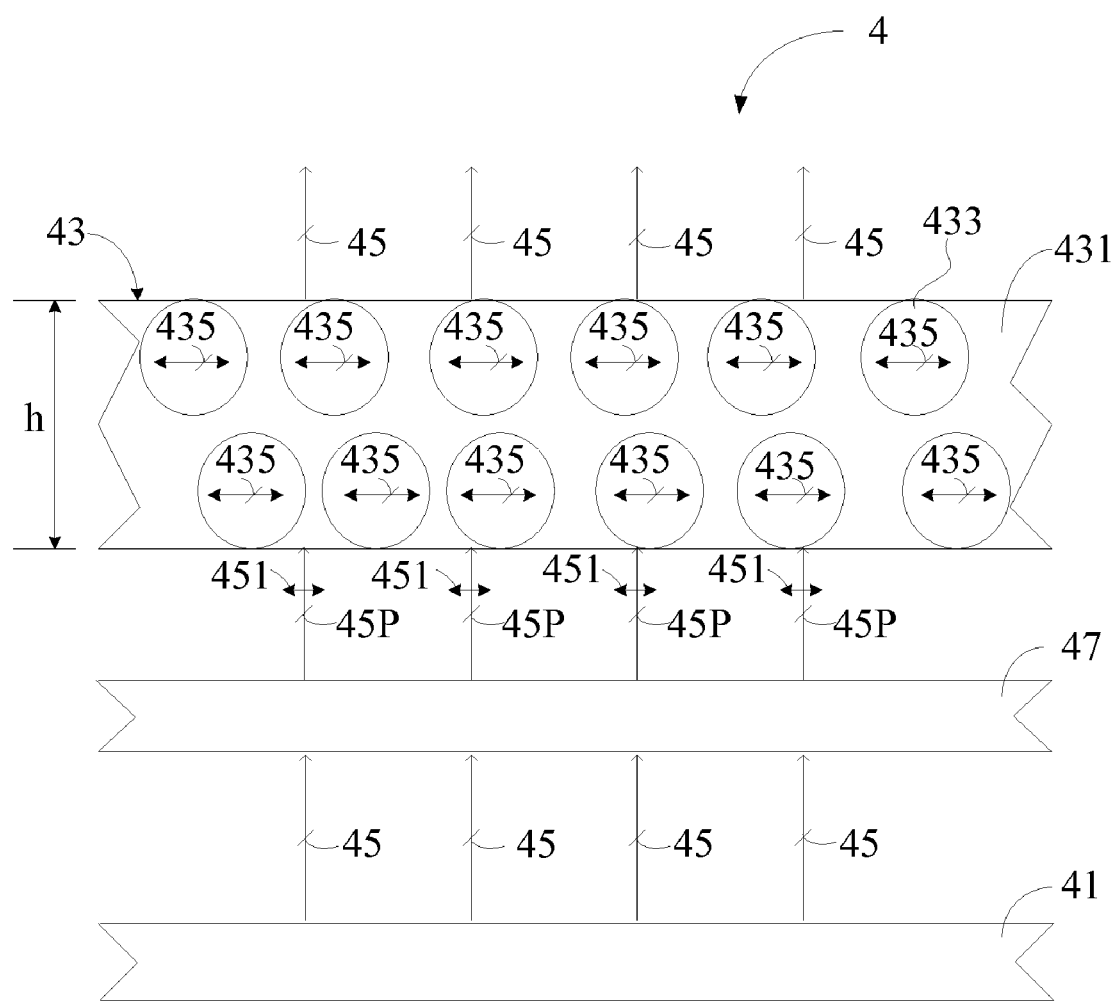
FIG. 4A is a schematic view of a display apparatus in an embodiment of the present invention.

FIG. 4A illustrates a schematic view of the second preferred embodiment of an anti-glare display apparatus 4 of the present invention. The display apparatus 4 comprises a light source 41, a linear polarizing thin film 47, and an optical compound layer 43. In general, a display panel, such as liquid crystal panel, of the display apparatus 4 is usually disposed between the optical compound layer 43 and the linear polarizing thin film 47. In other words, the optical compound layer 33 is most close to user than other elements. The optical compound layer 43 comprises a thin film 431 and a plurality of directional dopants 433. The arrangement of these optical components are generally the same as those of the display apparatus shown in FIG. 2, so reference may be made to the above description for arrangement of the optical components as well as the entire process in proper order of the light beam 45 from the light source 41 passing through the linear polarizing thin film 47 as a polarized light beam 45P and then exiting through the optical compound layer 43, and thus, no further description will be made herein. Before passing through the linear polarizing thin film 47, the light beam 45 may be a common light beam or a light beam of any polarization direction, e.g., linear polarization, elliptical polarization or circular polarization; but once it passes through the linear polarizing thin film 47, the light beam 45 becomes a linear polarized light beam 45P, which is then incident on the optical compound layer 43. In this embodiment, the directional thin film 331 is replaced by the thin film 431, and the dopants 333 are replaced by the directional dopants 433. More specifically, in this embodiment, the thin film 431 is non-directional, while the directional dopants 433 are directional.

More specifically, the material of the thin film 431 in this embodiment comprises at least one of the following materials: PMMA (Polymethylmethacrylate), PET (Polyethylene terephthalate), PES (Polysulfone) or PC (Polycarbonates). The thin film 431 has a first refractive index Fn ranging between 1.40 and 1.80.

The directional dopants 433 are arranged in the thin film 431 and aligned to have a second optical axis 435. The directional dopants 433 have a second refractive index $Dn_o$ or $Dn_e$ corresponding to the second optical axis 435, which ranges between 1.40 and 1.80. The second optical axis 435 is substantially parallel with a polarization direction 451 of the polarized light beam 45P passing through the optical compound layer 43. As a result, the polarized light beam 45P is adapted to pass through and exit from the optical compound layer 43. The optical axis 435 and the polarization direction 451 in FIG. 4A are only shown to indicate a physical phenomenon in the optics, but not to indicate that a material for guiding the light traveling direction "physically" exists in the directional dopants 433; likewise, the polarization direction 451 does not represent a specific traveling direction of the polarized light beam 45P, and the technical concept thereof can be readily understood by those skilled in the optics or photonics industry and thus will not be further described herein.

It should be noted that the plurality of directional dopants 433 are a plurality of spherical particles with a diameter that ranges substantially between 0.2 micrometers and 2 micrometers. The plurality of directional dopants 433 are made of a polymer material which comprises at least one of PVA (Polyvinyl Alcohol), PET (Polyethylene terephthalate), PES (Polysulfone), and PC (Polycarbonates). Additionally, the plurality of directional dopants 433 may also be made of a high molecular liquid crystal material, which comprises either a positive liquid crystal material or a negative liquid crystal material.

According to the above description, as long as a difference value between the first refractive index Fn and one of the second refractive indexes $Dn_o$, $Dn_e$ in the polarization direction of the exiting light ranges between 0 and 0.04 (i.e., $0 \leq |Dn_o - Fn| \leq 0.04$ or $0 \leq |Dn_e - Fn| \leq 0.04$), the optical compound layer 43 will become a substantially transparent film for the polarized light beam 45P passing through the polarizing thin film 47; and as long as a difference value between the first refractive index Fn and one of the other second refractive indexes $Dn_o$, $Dn_e$ ranges between 0.01 and 0.15 (i.e., $0.01 \leq |Dn_e - Fn| \leq 0.15$ or $0.01 \leq |Dn_o - Fn| \leq 0.15$), the ambient light will be allowed to transmit through the optical compound layer 43 without being reflected, thereby delivering an anti-glare effect. Consequently, the display apparatus 4 may not only provide the conventional anti-glare effect on the light exiting surface of the optical compound layer 43, but also significantly improve the color performance.

In summary, the second preferred embodiment may be rearranged and divided into a second embodiment A' and a second embodiment B' as shown in Table 2:

TABLE 2

| The second embodiment A' | The second optical axis 435 is parallel with the ordinary ray polarization direction |
|---|---|
| The directional dopants 433 + the thin film 431<br>$1.40 \leq Dn_o \leq 1.80$<br>$1.40 \leq Dn_e \leq 1.80$<br>$1.40 \leq Fn \leq 1.80$ | $0.01 \leq |Dn_o - Dn_e| \leq 0.15$<br>$0 \leq |Dn_o - Fn| \leq 0.04$<br>$0.01 \leq |Dn_e - Fn| \leq 0.15$ |
| The second embodiment B' | The second optical axis 435 is parallel with the extra-ordinary ray polarization direction |
| The directional dopants 433 + the thin film 431<br>$1.40 \leq Dn_o \leq 1.80$<br>$1.40 \leq Dn_e \leq 1.80$<br>$1.40 \leq Fn \leq 1.80$ | $0.01 \leq |Dn_o - Dn_e| \leq 0.15$<br>$0 \leq |Dn_e - Fn| \leq 0.04$<br>$0.01 \leq |Dn_o - Fn| \leq 0.15$ |

Figure 4B:
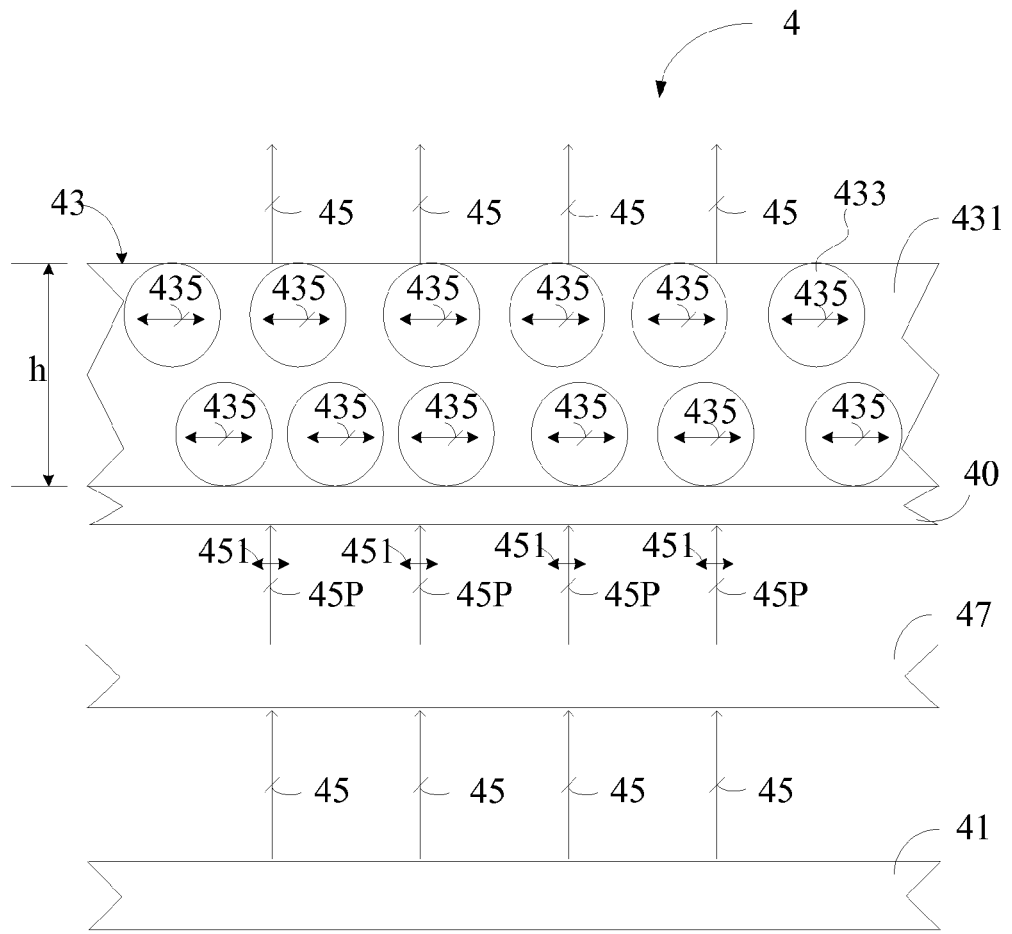
FIG. 4B is a schematic view of a display apparatus in an embodiment of the present invention.

It should be noted that, in real practice, the optical compound layer 43 would be formed on a substrate 40 for manufacturing reason. More specifically, the directional thin film 431 would be formed on a transparent substrate 40, such as, a glass substrate, as shown in FIG. 4B. The transparent substrate 40 only acts as a supporting base for the optical compound layer 43 without generating any substantial change for the optical features of the optical compound layer 43. Moreover, the directional thin film 431 would be preferably detached from the substrate 40 just as shown in FIG. 4A. In other embodiment, the substrate 40 may also be one of the substrates of the display panel. For example, the array substrate or the color filter substrate of the liquid crystal panel.

Additionally, if the light beam from the light source is linear polarized in the above embodiments, the linear polarizing thin film may be optionally omitted and the polarized light beam may pass through the optical compound layer directly.

Figure 5:
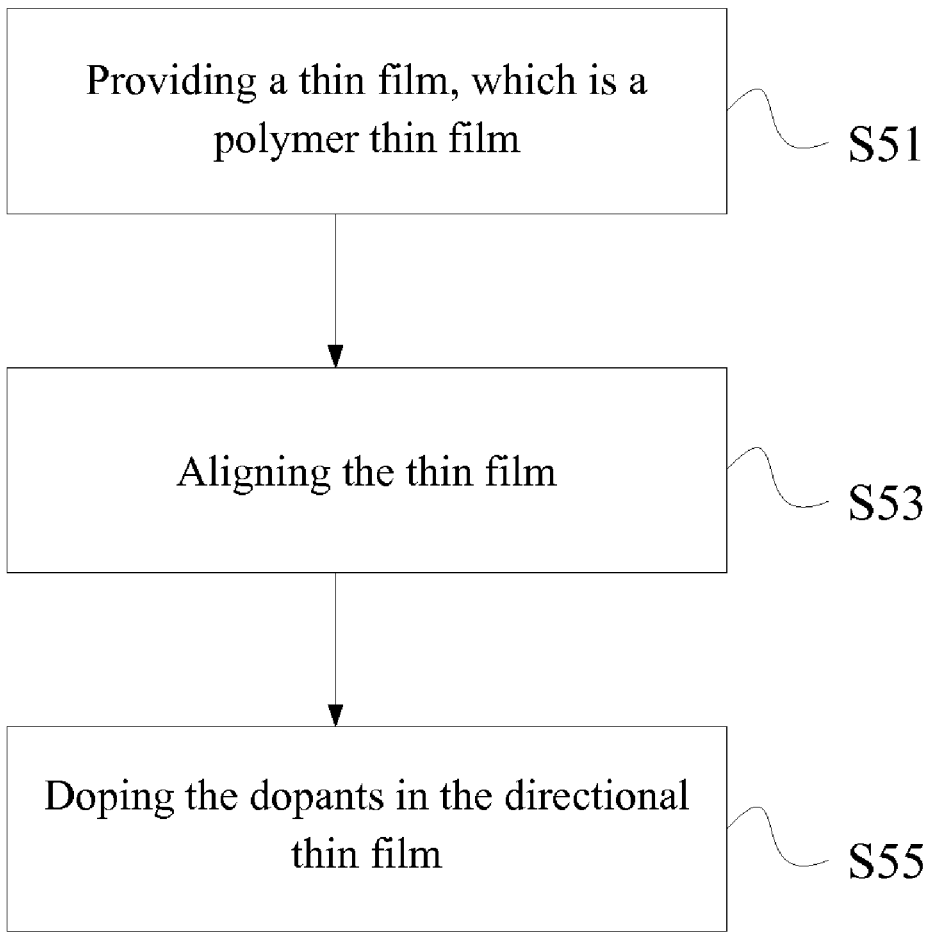
FIG. 5 is a flowchart of the process of manufacturing an optical compound layer according to the present invention.

The present invention also provides a method for manufacturing a display apparatus, and especially a method for manufacturing an optical compound layer for use in a display apparatus. This method can provide a display apparatus with both an anti-glare effect and high contrast. FIG. 5 illustrates a flowchart of a process of manufacturing an optical compound layer, especially a process of manufacturing the optical compound layer described in the embodiments of FIG. 3A and FIG. 3B.

Initially, in step S51, a thin film, which is a polymer thin film formed on a substrate and the substrate would be optionally detached or remained in the final product, is provided.

Then, in step S53, the thin film is aligned to transform the thin film into a directional thin film. In particular, the process of aligning the thin film comprises the following methods: (1) stretching the polymer thin film to transform it into an initial directional thin film; and (2) rubbing the initial directional thin film to transform it into an aligning film, then forming a high molecular liquid crystal thin film onto the aligning film, and finally, solidifying the high molecular liquid crystal thin film to form a directional thin film, in which the step of solidifying the high molecular liquid crystal thin film is to illuminate the high molecular liquid crystal thin film with ultraviolet. Finally in step S55, the plurality of the dopants is doped in the directional thin film. The substrate and/or the aligning film would be optionally detached or remained in the final product.

Figure 6:
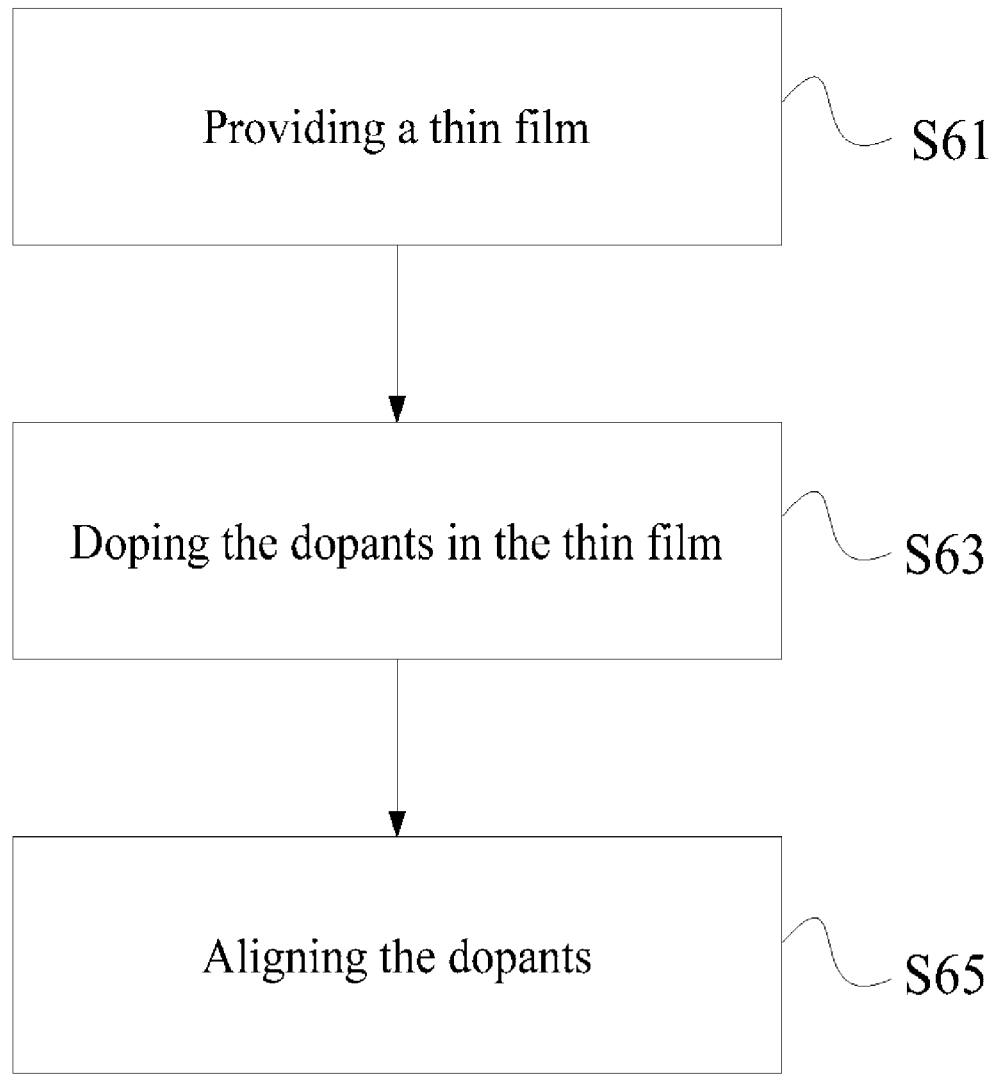
FIG. 6 is a flowchart of another process of manufacturing an optical compound layer according to the present invention.

The present invention further provides another method for manufacturing an optical compound layer, and especially a method for manufacturing the optical compound layer described in the embodiment of FIG. 4A, a flowchart of which is shown in FIG. 6.

Initially, in step S61, a thin film, which is formed on a substrate and the substrate would be optionally detached or remained in the final product, is provided. Then, in step S63, the plurality of dopants is doped in the thin film. Finally, in step S65, the plurality of dopants is aligned to transform into the plurality of directional dopants by illuminating the dopants with ultraviolet.

According to the above descriptions, the display apparatus and the manufacturing method therefor disclosed in the present invention can not only deliver an anti-glare effect when ambient light is incident on the optical compound layer of the display apparatus, but also enhance the front-view image contrast to mitigate the scattering of the exiting light, thereby significantly improving the output quality of images.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A display apparatus comprising:
a light source, being adapted to emit light beam, the light beam having a polarization direction; and
an optical compound layer, disposed on the light source correspondingly to receive the light beam, the optical compound layer comprising:
a directional thin film, having a first refractive indexes corresponding to a first optical axis, the first optical axis being parallel with the polarization direction; and
a plurality of dopants, having a second refractive index and arranged in the directional thin film;
wherein both of the first refractive index and the second refractive index are ranging between 1.40 and 1.80, and a difference value between the first refractive index and the second refractive index ranges from 0 to 0.04.

2. A display apparatus comprising:
a light source, being adapted to emit light beam, the light beam having a polarization direction; and
an optical compound layer, disposed on the light source correspondingly to receive the light beam, the optical compound layer comprising:
a thin film, having a first refractive index;
a plurality of directional dopants, arranged in the thin film, the directional dopants having a second refractive index corresponding to a second optical axis, the second optical axis being parallel with the polarization direction; and;
wherein both of the first refractive index and the second refractive index are ranging between 1.40 and 1.80, and a difference value between the first refractive index and the second refractive index ranges from 0 to 0.04.

3. A display apparatus, comprising:
a light source, being adapted to emit a light beam, the light beam having an ordinary ray polarization direction and an extra-ordinary ray polarization direction; and
an optical compound layer, disposed corresponding to the light source for receiving the light beam, the optical compound layer comprising:
a directional thin film, having a first optical axis, a refractive index $Fn_o$ corresponding to the ordinary ray, and a refractive index $Fn_e$ corresponding to the extra-ordinary ray, and $0.01 \leq |Fn_o - Fn_e| \leq 10.15$; and
a dopant, arranged in the directional thin film and having a refractive index Dn.

4. The display apparatus as claimed in claim 3, wherein $1.40 \leq Fn_o \leq 1.80$, $1.40 \leq Fn_e \leq 1.80$, and $1.40 \leq Dn \leq 1.80$.

5. The display apparatus as claimed in claim 3, further comprising a linear polarization thin film, disposed between the light source and the optical compound layer.

6. The display apparatus as claimed in claim 5, wherein the first optical axis is parallel with the ordinary ray polarization direction.

7. The display apparatus as claimed in claim 6, wherein $0 \leq |Fn_o - Dn| \leq 0.04$.

8. The display apparatus as claimed in claim 6, wherein $0.01 |Fn_e - Dn| \leq 0.15$.

9. The display apparatus as claimed in claim 5, wherein the first optical axis is parallel with the extra-ordinary ray polarization direction.

10. The display apparatus as claimed in claim 9, wherein $0 \leq |Fn_e - Dn| \leq 0.04$.

11. The display apparatus as claimed in claim 9, wherein $0.01 \leq |Fn_o - Dn| \leq 0.15$.

12. The display apparatus as claimed in claim 3, wherein the directional thin film is formed on a substrate.

13. A display apparatus, comprising:
a light source, being adapted to emit a light beam, the light beam having an ordinary ray polarization direction and an extra-ordinary ray polarization direction; and
an optical compound layer, disposed corresponding to the light source for receiving the light beam, the optical compound layer comprising:
a thin film, having a refractive index Fn;
a directional dopant, disposed in the thin film, having a second optical axis, a refractive index $Dn_o$ corresponding to the ordinary ray and a refractive index $Dn_e$ corresponding to the extra-ordinary ray, and $0.01 \leq |Dn_o - Dn_e| \leq 10.15$.

14. The display apparatus as claimed in claim 13, wherein $1.40 \leq Dn_o \leq 1.80$, $1.40 \leq Dn_e \leq 1.80$, and $1.40 \leq Fn \leq 1.80$.

15. The display apparatus as claimed in claim 13, further comprising a linear polarization thin film, disposed between the light source and the optical compound layer.

16. The display apparatus as claimed in claim 15, wherein the second optical axis is parallel with the ordinary ray polarization direction.

17. The display apparatus as claimed in claim 16, wherein $0 \leq |Dn_o - Fn| \leq 0.04$.

18. The display apparatus as claimed in claim 16, wherein $0.01 \leq |Dn_e - Fn| \leq 0.15$.

19. The display apparatus as claimed in claim 15, wherein the second optical axis is parallel with the extra-ordinary ray polarization direction.

20. The display apparatus as claimed in claim 19, wherein $0 \leq |Dn_e - Fn| \leq 0.04$.

21. The display apparatus as claimed in claim 19, wherein $0.01 \leq |Dn_o - Fn| \leq 0.15$.

22. The display apparatus as claimed in claim 13, wherein the thin film is formed on a substrate.

* * * * *